(12) United States Patent  
Marten

(10) Patent No.: US 8,350,552 B1
(45) Date of Patent: Jan. 8, 2013

(54) VOLTAGE REFERENCE AND TEMPERATURE SENSOR

(75) Inventor: Victor Marten, Flushing, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 13/582,413

(22) PCT Filed: Dec. 5, 2011

(86) PCT No.: PCT/IB2011/055471
§ 371 (c)(1), (2), (4) Date: Sep. 1, 2012

(87) PCT Pub. No.: WO2012/077041
PCT Pub. Date: Jun. 14, 2012

Related U.S. Application Data

(60) Provisional application No. 61/421,957, filed on Dec. 10, 2010.

(51) Int. Cl.
*G05F 1/648* (2006.01)

(52) U.S. Cl. ......... 323/297; 323/283; 323/285; 323/369

(58) Field of Classification Search ............... 323/297, 323/283, 285, 284, 369; 327/538
See application file for complete search history.

(56) References Cited

U.S. PATENT DOCUMENTS

| | | | |
|---|---|---|---|
| 4,384,217 A | 5/1983 | Tsividis | |
| 6,650,173 B1 * | 11/2003 | Khouri et al. | 327/538 |
| 7,034,603 B2 | 4/2006 | Brady et al. | |
| 7,804,333 B2 * | 9/2010 | Kim | 327/52 |

FOREIGN PATENT DOCUMENTS

| | | |
|---|---|---|
| JP | 2002-182758 A | 6/2002 |
| KR | 10-2006-0017819 A | 2/2006 |

OTHER PUBLICATIONS

International Search Report mailed Aug. 24, 2012 in application No. PCT/IB2011/055471.

Written Opinion mailed Aug. 24, 2012 in application No. PCT/IB2011/055471.

* cited by examiner

*Primary Examiner* — Shawn Riley
(74) *Attorney, Agent, or Firm* — Oppedahl Patent Law Firm LLC

(57) ABSTRACT

A highly accurate voltage reference and temperature sensor circuit requires only several low-cost components in addition to a general-purpose microcontroller with an analog-to-digital converter. Unlike known circuits, the circuit disclosed does not rely on matching between a pair of semiconductor devices, as only a single semiconductor junction is used. All of the signal processing may be performed digitally.

12 Claims, 2 Drawing Sheets

$$I = I_s \left( e^{\frac{V_D}{nV_T}} - 1 \right)$$

$$V_T = \frac{kT}{q}$$

(a)          (b)          (c)

VOLTAGE REFERENCE AND TEMPERATURE SENSOR

BACKGROUND

Whenever voltages (or any parameters represented by voltages) need to be measured or digitized, it is necessary to have a voltage reference. Most electronic devices of any complexity have one or more references, for example in a signal processing chain or in the power supply circuitry.

Depending on the desired overall system accuracy, the requirements for voltage references vary greatly; however it is clear that if well designed, a voltage reference should be relatively insensitive to deviations in its own power supply and to variations in its temperature.

As with any other engineering challenge, the design of a voltage reference forces tradeoffs. Designing a voltage reference to be highly accurate despite changes in temperature, for example, usually makes it much more expensive.

The designer of a voltage reference, in pursuit of temperature stability, will usually draw upon a bit of good luck, which is that nature will sometimes be so cooperative as to make it possible to develop a first circuit yielding a voltage having a linear relationship to temperature (with some first measurable coefficient) over some useful dynamic range, and to develop a second circuit yielding a voltage having a linear relationship to temperature (with some second measurable coefficient non-identical to the first coefficient) over that same useful dynamic range. It is particularly helpful if the two coefficients differ in sign; this prompts designers to utilize the scheme illustrated in FIG. 1. This figure shows two voltages (Vn and Vp), each having a prescribed relationship to the changes in temperature. Nature cooperates by providing one voltage that is decreasing when the temperature is increasing, commonly called CTAT or Complimentary To Absolute Temperature; and by providing another voltage that is increasing when the temperature is increasing, commonly called PTAT or Proportional To Absolute Temperature.

With these two voltages available, the designer applies an appropriate linear amplification to one of the voltages in order to make the rates of change, created by temperature changes, of both voltages equal in magnitude but with opposite signs. Then, the two voltages are added together, with a resulting sum that is relatively temperature independent.

In the example of FIG. 1, we see that the slope of the PTAT line is shallower, so the voltage that gets amplified is the PTAT voltage. The gain of the amplification is selected so that the slope of the K*Vp line is (as closely as is possible) equal and opposite to that of the Vn line. The goal of course is that the sum of these two will be relatively temperature independent.

One common method for the establishment of the CTAT and PTAT voltages is the utilization of semiconductor diodes (or bipolar transistors), which are behaving according to the "classic" Shockley diode equation shown in FIG. 4($a$). An approximate relationship may be derived from the Shockley diode equation:

$$V_1 - V_2 = \Delta V_d = (nk/q) * T * \ln(J_1/J_2) \quad \text{[Equation 1]}$$

where:
  $V_1$ and $V_2$ are the voltages formed by forward-biasing the diodes with currents that establish current densities $J_1$ and $J_2$;
  quantity ($nk/q$) is (for the present purposes) a constant; and
  T is the absolute (Kelvin) temperature.

From Equation 1 we see that the difference voltage $\Delta V_d$ has a PTAT characteristic.

At the same time, the forward voltage of the diode has CTAT characteristics due to temperature dependency of the quantity $I_s$ in the Shockley diode equation (FIG. 4($a$)).

Most of the present-day low-voltage (below five volts) voltage references are based on the above principles. Prior art circuits depicting the groundbreaking actual realizations are shown in FIG. 2 (Widlar) and FIG. 3 (Brokaw).

From FIGS. 2 and 3 we see that each of these circuits utilizes and indeed depends for its accuracy upon matched semiconductor devices.

The circuit in FIG. 2, for example, develops its diode voltage difference due to differing currents passing through equal and matched units.

The circuit in FIG. 3 develops the diode voltage difference due to specifically designed sizes of the matched units, so that approximately the same current will create differing current densities which are inversely proportional to the size of the respective junction. Notice the notation "8A" that signifies that the device in location Q2 is to be eight times larger than the device in location Q1. One way to do this, of course, is to create this larger device at Q2 by simply connecting eight devices equivalent to Q1 in parallel.

The alert reader will thus appreciate that the degree of success in making the voltage reference circuit accurate despite changes of temperature depends greatly upon the degree of success in either the matching of similar devices (FIG. 2), or the degree of success in bringing about some particular physical ratio of size (FIG. 3).

In order to provide sufficiently-matched components, the designers have to resort to making the matched devices very large, so that the geometrical processing errors in the manufacture of the integrated circuits (ICs) have a diminishing effect on the matching; however, this increases the costs of manufacture, as more area is required on the surface of the IC die. This also uses up die real estate that could have been given to some other purpose.

The alert reader will also have appreciated that the accuracy of Equation 1 depends on both semiconductor devices having exactly the same temperature. Saying the same thing differently, if the two devices were to be at non-identical temperatures, then the results of Equation 1 would be less helpful in providing a temperature compensation mechanism for a voltage reference.

The approaches of FIG. 2 or 3 thus lead to a further design goal which is to reduce to a minimum the temperature difference between the two junctions. One design approach toward this goal includes splitting each of the matched devices into several parallel-connected units, and positioning the units utilizing geometrical symmetry considerations. But the fact remains that a temperature gradient inside the IC will create errors, and these errors cannot be completely eradicated.

Helpful background information may be found at:
  W. B. Shockley, "Electrons and Holes in Semiconductors," Van Nostrand, 1950.
  R. J. Widlar, "New Developments in IC Voltage Regulators," IEEE Journal of Solid-State Circuits, vol. SC-6, no. 1, pp. 2-7, February 1971.
  A. P. Brokaw, "A Simple Three-Terminal IC Bandgap Reference," IEEE Journal of Solid-State Circuits, vol. SC-9, no. 6, pp. 388-393, December 1974.
  Y. P. Tsividis, "Accurate Analysis of Temperature Effects in Ic-Vbe Characteristics with Application to Bandgap Reference Sources," IEEE Journal of Solid-State Circuits, vol. SC-15, no. 6, pp. 1076-1084, December 1980.
  U.S. Pat. No. 4,384,217 to Tsividis.

From the above discussion it may be seen that it would be very helpful if some approach could be found by which a voltage reference could be temperature compensated without the many drawbacks discussed.

SUMMARY OF THE INVENTION

The current invention teaches a method that guarantees the "matching", as there is only a single semiconductor device used. This alleviates both problems due to size differences and due to variations in temperature. Drawing upon the teachings of the current invention, the semiconductor devices used for creation of the reference voltage can be very small, and the associated circuit can be manufactured utilizing the smallest-possible geometries.

Moreover, if a microcontroller with a built-in analog-to-digital converter is already a required part of the complete system, then a precise, high-accuracy, and low-power voltage reference can be formed by the mere addition of several low-cost components.

DESCRIPTION OF THE DRAWING

The current invention is disclosed with the aid of a drawing in several figures, of which.

DETAILED DESCRIPTION

Figure 5:
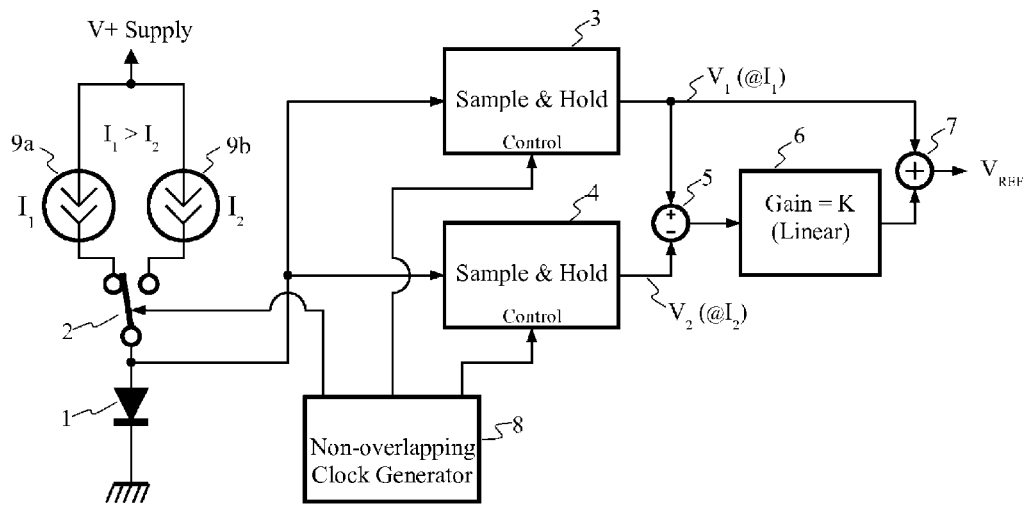
FIG. 5 discloses one exemplary embodiment of the current invention, suitable for incorporation into a solid-state integrated circuit.

Disclosed in FIG. 5 is one exemplary embodiment of the current invention, suitable for incorporation into a solid-state integrated circuit.

Two different currents pass through PN diode 1 as controlled by a switch 2. The resulting diode's voltages are stored, correspondingly, by the sample and hold circuits 3 and 4.

Voltage $V_1$ is used directly as the CTAT component of the reference voltage; and a linearly amplified difference between $V_1$ and $V_2$ comprises the PTAT portion of the reference voltage.

A non-overlapping (break before make) clock generator 8 controls both which current is flowing in the diode, and which sample and hold circuit is activated (after an appropriate settling delay). The frequency of this clock generator need not be precise and/or stable.

Figure 6:
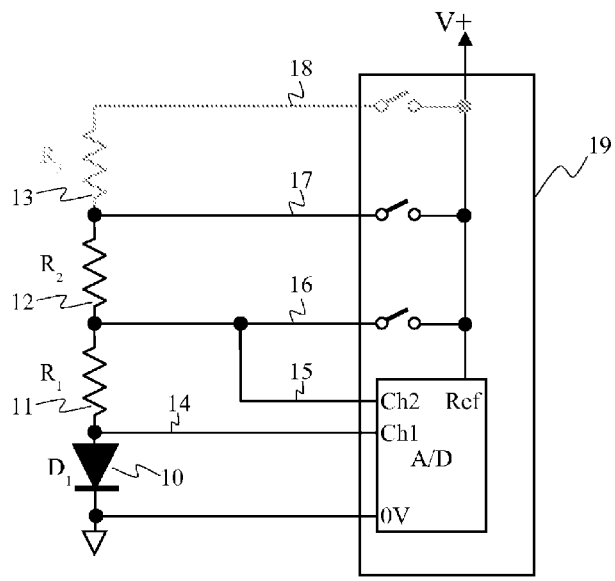
FIG. 6 shows one exemplary embodiment of the current invention, suitable for application with an A/D-equipped microcontroller.

Revealed in FIG. 6 is one exemplary embodiment of the current invention that is suitable for application with an A/D-equipped microcontroller. For example in a given application there may already be an A/D-equipped microcontroller so as to satisfy some other design need. In such an application, the addition of a small number of very inexpensive external components suffices to deliver the benefits of the invention.

A microcontroller with built-in A/D converter 19 activates, in turn, one of the switches that are connected to lines 16, 17, and 18 (in other words, it drives one and only one port pin high). This action creates a current determined by the values of the resistors R1, R2, and R3 (11, 12, and 13); the exact currents are not known, however, the ratios between all of the currents can be precisely calculated by measuring the voltage drops across resistor R1 (11) with the on-board A/D converter's Ch1 and Ch2 (or an appropriately-configured single differential A/D channel). Exact precision values (and/or exact ratios of the values) for any of the resistors R1, R2, and R3 (11, 12, and 13) are not required. Saying this differently, the resistors can be inexpensive low-precision resistors.

Furthermore, the voltage across diode D1 (10) is measured by the A/D converter.

At this stage, all measured data is expressed in A/D counts, and the exact voltages are not known; however, as will be appreciated, the combined measured data are sufficient to calculate the exact value of the supply voltage V+. In this case the output of the calculation is not the voltage reference itself, but is a value indicative of the magnitude of a voltage already present elsewhere in the circuit (here, the supply voltage V+) which is then used as the A/D reference.

Figure 1:
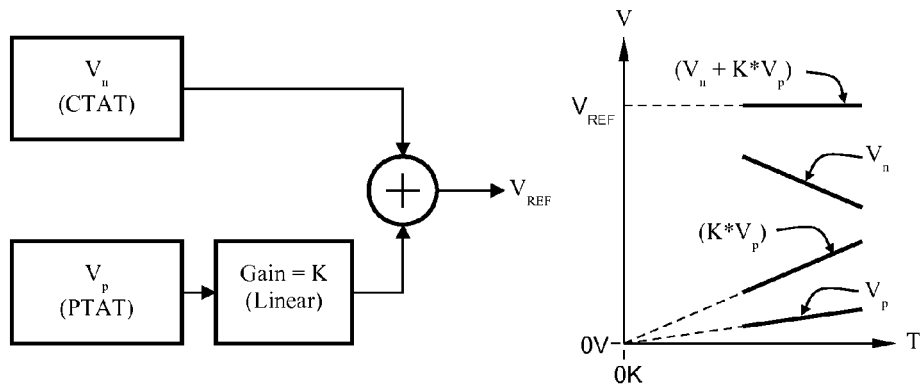
FIG. 1 illustrates the establishment of a temperature-independent reference voltage.
Figure 2:
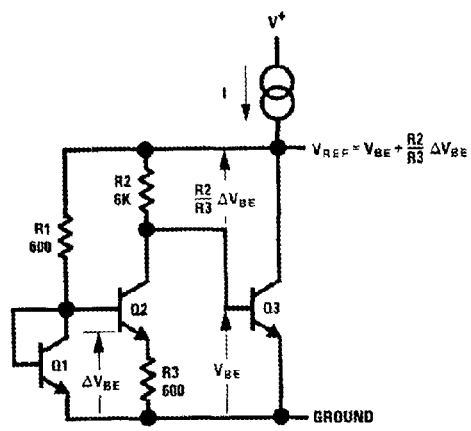
FIG. 2 and FIG. 3 depict prior-art circuits.
Figure 3:
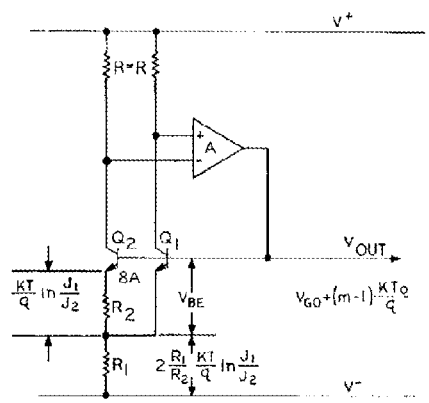
Figure 4:
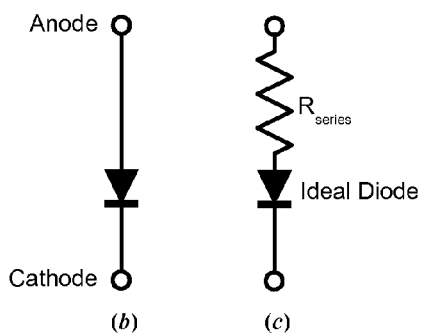
FIG. 4(a) shows a Shockley diode equation.
FIG. 4(b) shows a semiconductor diode.
FIG. 4(c) shows a simple model of a diode.

Utilization of 3 (three) test currents allows for exclusion of errors due to parasitic resistance $R_{series}$ of the diode (FIG. 4(c)).

Various compensation algorithms can be applied digitally in order to correct second-order effects of the reference voltage dependency on the temperature; similar functionality is very hard to implement in "hardwired" integrated circuits.

Calibrations at multiple various temperatures can be made and calibration data stored, to be put to use so as to improve temperature stability of the Reference Voltage.

Due to the precisely linear nature of the PTAT signal (calculated digitally and internally in the microcontroller 19), it is possible to measure the temperature of the diode D1 precisely. For this reason a system with multiple temperature-sensing diodes (that can also be utilized to improve the accuracy of the reference voltage by, for example, averaging) can be readily and inexpensively fashioned.

The alert reader will have no difficulty devising myriad obvious variations and improvements upon the invention, after having appreciated the teachings herein. It is intended that the claims which follow will embrace such variations and improvements.

The invention claimed is:

1. Apparatus for providing a voltage reference, the apparatus comprising:
   a semiconductor device;
   current means selectively and alternatively passing a first current or a second current, the second current smaller in magnitude than the first current, through the semiconductor device;
   first measurement means measuring a first voltage drop across the semiconductor device during the passing of the first current;
   second measurement means measuring a second voltage drop across the semiconductor device during the passing of the second current;
   calculation means responsive to the first voltage drop and to the second voltage drop, yielding a voltage reference.

2. The apparatus of claim 1 wherein the semiconductor device, the current means, the first measurement means, the second measurement means, and the calculation means are all incorporated into a single solid-state integrated circuit.

3. The apparatus of claim 2 wherein the calculation means subtracts the second voltage drop from the first voltage drop, multiplies that difference by a predetermined constant, yielding a product, and adds the product to the first voltage drop, yielding information indicative of the voltage reference.

4. The apparatus of claim 2 wherein the semiconductor device is a diode.

5. The apparatus of claim 1 wherein the apparatus comprises a microcontroller with a built-in analog-to-digital converter, the analog-to-digital converter defining at least a first measurement terminal, the microcontroller having first and second discrete outputs, the semiconductor device external to the microcontroller, the semiconductor device having first and second terminals, a first resistor, the first resistor having first and second terminals, and a second resistor, the second resistor having first and second terminals, the first terminal of the semiconductor device connected with the second terminal of the first resistor and with the at least a first measurement terminal, the first terminal of the first resistor connected with the second terminal of the second resistor and with the first discrete output, the first terminal of the second resistor connected with the second discrete output;

the first resistor and the first discrete output defining the current means passing the first current;

the first resistor and the second resistor and the second discrete output defining the current means passing the second current.

6. The apparatus of claim 5 wherein the apparatus further comprises a third resistor, the third resistor having first and second terminals, wherein the microcontroller further comprises a third discrete output, the first terminal of the second resistor also connected with the second terminal of the third resistor, and the first terminal of the third resistor connected with the third discrete output.

7. The apparatus of claim 5 wherein the connection between the first terminal of the semiconductor device and the at least a first measurement terminal is multiplexed, the at least a first measurement terminal also connected in multiplexed fashion with first terminal of the first resistor, wherein the analog-to-digital converter and the multiplexed at least a first measurement terminal defining the first measurement means and the second measurement means.

8. The apparatus of claim 5 wherein the analog-to-digital converter further defines a second measurement terminal, the second measurement terminal connected with the first terminal of the first resistor, the analog-to-digital converter and the first measurement terminal define the first measurement means and the analog-to-digital converter and the second measurement terminal define the second measurement means.

9. The apparatus of claim 5 wherein the semiconductor device is a diode.

10. A method for providing a voltage reference, the method comprising the steps of:

passing a first current through a semiconductor device, and measuring a first voltage drop across the semiconductor device during the passing of the first current; passing a second current through the semiconductor device, the second current smaller in magnitude than the first current, and measuring a second voltage drop across the semiconductor device during the passing of the second current; and carrying out a calculation responsive to the first voltage drop and to the second voltage drop, yielding information indicative of a voltage reference.

11. The method of claim 10 wherein the semiconductor device is a diode.

12. The method of claim 10 wherein the carrying out of the calculation comprises:

subtracting the second voltage drop from the first voltage drop;

multiplying that difference by a predetermined constant, yielding a product, and adding the product to the first voltage drop, yielding information indicative of the voltage reference.

* * * * *